(12) United States Patent
Peterffy

(10) Patent No.: US 9,830,645 B2
(45) Date of Patent: Nov. 28, 2017

(54) COMPUTERIZED METHOD AND SYSTEM FOR SCALE TRADING

(75) Inventor: Thomas Pechy Peterffy, Greenwich, CT (US)

(73) Assignee: INTERACTIVE BROKERS LLC, Greenwich, CT (US)

( * ) Notice: Subject to any disclaimer, the term of this patent is extended or adjusted under 35 U.S.C. 154(b) by 935 days.

(21) Appl. No.: 13/606,988

(22) Filed: Sep. 7, 2012

(65) Prior Publication Data

US 2013/0006832 A1    Jan. 3, 2013

Related U.S. Application Data

(63) Continuation of application No. 12/251,316, filed on Oct. 14, 2008, now abandoned.

(51) Int. Cl.
*G06Q 40/00* (2012.01)
*G06Q 40/04* (2012.01)
*G06Q 40/06* (2012.01)

(52) U.S. Cl.
CPC ............. *G06Q 40/00* (2013.01); *G06Q 40/04* (2013.01); *G06Q 40/06* (2013.01)

(58) Field of Classification Search
CPC ......... G06Q 40/00; G06Q 40/04; G06Q 40/06
USPC .......................................................... 705/35
See application file for complete search history.

(56) References Cited

U.S. PATENT DOCUMENTS

| | | | |
|---|---|---|---|
| 4,677,552 A * | 6/1987 | Sibley, Jr. | 705/37 |
| 6,983,260 B2 | 1/2006 | Hummelgren | |
| 7,251,629 B1 | 7/2007 | Marynowski et al. | |
| 7,340,430 B2 | 3/2008 | Mulinder et al. | |
| 7,418,416 B2 | 8/2008 | Guidi et al. | |
| 7,447,655 B2 | 11/2008 | Brumfield et al. | |
| 7,552,085 B2 | 6/2009 | Amburn | |
| 7,574,391 B1 | 8/2009 | Monroe et al. | |
| 7,680,722 B2 | 3/2010 | Bok et al. | |

(Continued)

FOREIGN PATENT DOCUMENTS

| | | |
|---|---|---|
| EP | 2465088 | 6/2012 |
| WO | 2010045353 | 4/2010 |
| WO | 2011019969 | 2/2011 |

OTHER PUBLICATIONS

International Search Report and Written Opinion from International application No. PCT/US10/45390, dated Oct. 13, 2010.

*Primary Examiner* — Kirsten Apple
(74) *Attorney, Agent, or Firm* — Stroock & Stroock & Lavan, LLP

(57) ABSTRACT

Disclosed embodiments include computer-implemented methods and systems that permit a market participant to automatically scale a block order into relatively smaller, incrementally priced scale trade component orders based on scale order parameters (such as price and size) provided by the market participant. The scale orders may continue automatically, without the need for further intervention from the market participant, until the total number of shares specified by the market participant is accumulated or sold. Some embodiments also permit the market participant to automatically submit opposite-side profit-taking component orders against the market participant's original scale order components. The profit-taking orders can be automatically created and submitted when the original scale order component has executed.

30 Claims, 10 Drawing Sheets

(56) References Cited

U.S. PATENT DOCUMENTS

| | | |
|---|---|---|
| 7,685,038 B2 | 3/2010 | Stevens et al. |
| 7,716,121 B2 | 5/2010 | Walsky et al. |
| 7,827,092 B2 | 11/2010 | Chait et al. |
| 7,848,992 B2 | 12/2010 | Turner |
| 7,890,417 B2 | 2/2011 | Hanson et al. |
| 7,966,249 B1 * | 6/2011 | Dawson .............. G06Q 30/08 705/1.1 |
| 8,069,106 B2 | 11/2011 | Waelbroeck et al. |
| 8,165,954 B2 | 4/2012 | Waelbroeck et al. |
| 8,612,329 B1 * | 12/2013 | Steidlmayer .......... G06Q 40/04 705/35 |
| 2001/0044771 A1 * | 11/2001 | Usher et al. .................. 705/37 |
| 2002/0055901 A1 | 5/2002 | Gianakouros et al. |
| 2002/0069156 A1 * | 6/2002 | Adam et al. .................. 705/37 |
| 2003/0033235 A1 | 2/2003 | Hummelgren |
| 2003/0078865 A1 | 4/2003 | Lee |
| 2003/0115128 A1 | 6/2003 | Lange et al. |
| 2004/0177024 A1 | 9/2004 | Bok et al. |
| 2004/0210511 A1 | 10/2004 | Waelbroeck et al. |
| 2005/0044034 A1 * | 2/2005 | Perry et al. .................. 705/37 |
| 2005/0228741 A1 | 10/2005 | Leibowitz |
| 2005/0246261 A1 | 11/2005 | Stevens et al. |
| 2006/0167779 A1 | 7/2006 | Turner |
| 2006/0235785 A1 | 10/2006 | Chait et al. |
| 2007/0038550 A1 | 2/2007 | Caille et al. |
| 2007/0150407 A1 * | 6/2007 | Gilboy ......................... 705/37 |
| 2007/0198391 A1 | 8/2007 | Dreyer et al. |
| 2007/0288343 A1 | 12/2007 | Reinkensmeyer et al. |
| 2008/0077539 A1 | 3/2008 | Drain |
| 2008/0097893 A1 | 4/2008 | Walsky et al. |
| 2008/0249960 A1 | 10/2008 | Amburn |
| 2008/0275808 A1 | 11/2008 | Mackay |
| 2009/0089199 A1 | 4/2009 | Waelbroeck et al. |
| 2009/0099952 A1 | 4/2009 | Wahlberg |
| 2010/0094745 A1 | 4/2010 | Peterffy |
| 2010/0094772 A1 | 4/2010 | Peterffy |

* cited by examiner

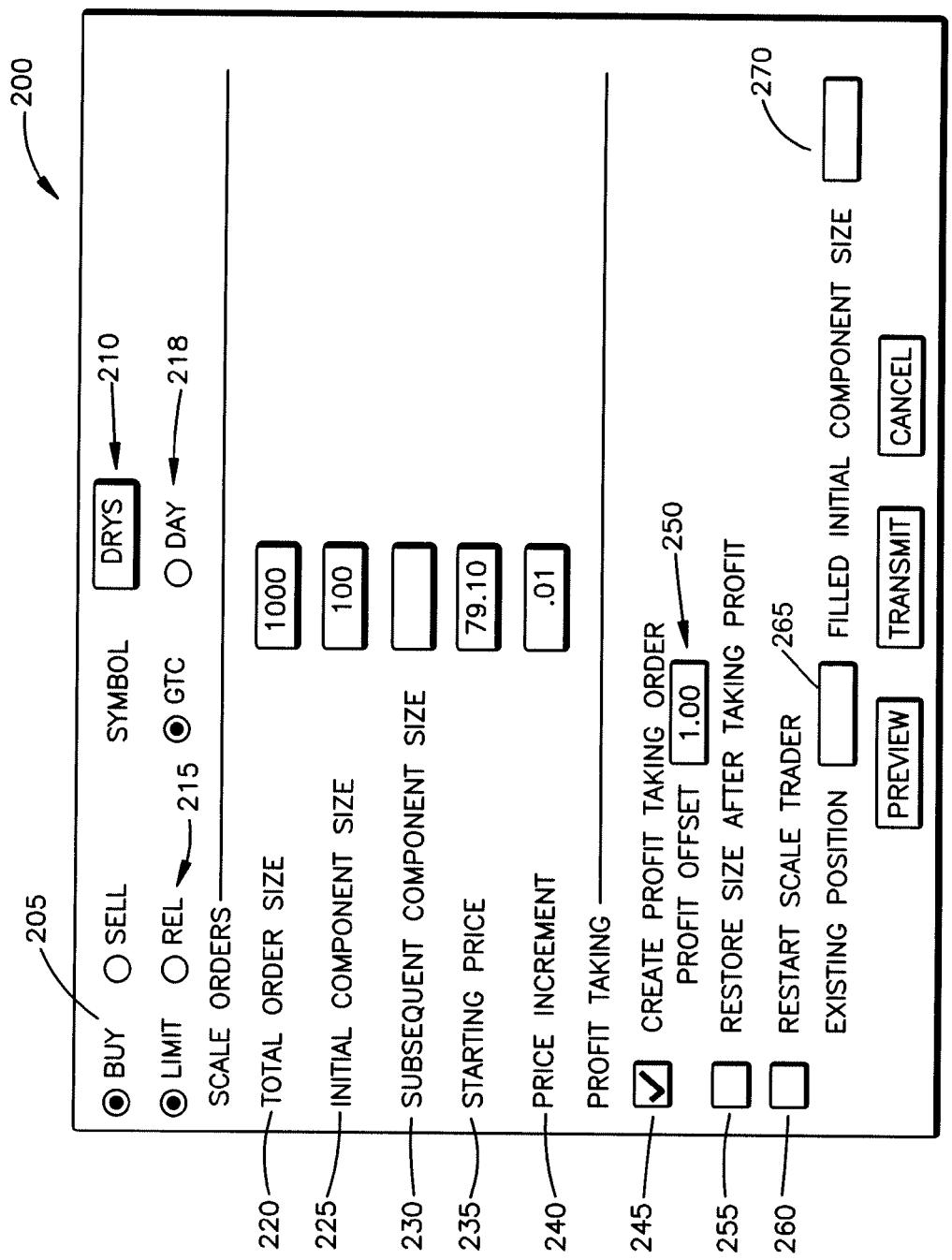

Scale Progress

BUY 1000 DRYS @ 79.10 100X−0.01x1.0

| Price | Buy (Open) | | Sell (Close) | | Refresh |
|---|---|---|---|---|---|
| | Open | Filled | Open | Filled | |
| 79.10 | 100 | 0 | | | |
| 79.09 | 100 | 0 | | | |
| 79.08 | 100 | 0 | | | |
| 79.07 | 100 | 0 | | | |
| 79.06 | 100 | 0 | | | |
| 79.05 | 100 | 0 | | | |
| 79.04 | 100 | 0 | | | |
| 79.03 | 100 | 0 | | | |
| 79.02 | 100 | 0 | | | |
| 79.01 | 100 | 0 | | | |

Fig.3A

| Scale Progress | | | | |
|---|---|---|---|---|
| BUY 1000 DRYS @ 79.10 100X−0.01x1.0 | | | | Refresh |
| | Buy (Open) | | Sell (Close) | |
| Price | Open | Filled | Open | Filled |
| 80.10 | | | 100 | 0 |
| 80.09 | | | 100 | 0 |
| 80.08 | | | 100 | 0 |
| 80.07 | | | 100 | 0 |
| 80.06 | | | 100 | 0 |
| 79.10 | 0 | 100 | | |
| 79.09 | 0 | 100 | | |
| 79.08 | 0 | 100 | | |
| 79.07 | 0 | 100 | | |
| 79.06 | 100 | 0 | | |
| 79.05 | 100 | 0 | | |
| 79.04 | 100 | 0 | | |
| 79.03 | 100 | 0 | | |
| 79.02 | 100 | 0 | | |
| 79.01 | 100 | 0 | | |

Fig.3B

Scale Progress

BUY 1000 DRYS @ 79.10 100X−0.01x1.0

| Price | Buy (Open) | | Sell (Close) | |
|---|---|---|---|---|
| | Open | Filled | Open | Filled |
| 80.10 | | | 100 | 0 |
| 80.09 | | | 0 | 100 |
| 80.08 | | | 0 | 100 |
| 80.07 | | | 0 | 100 |
| 80.06 | | | | |
| 79.10 | 0 | 100 | | |
| 79.09 | 0 | 100 | | |
| 79.08 | 0 | 100 | | |
| 79.07 | 0 | 100 | | |
| 79.06 | 100 | 0 | | |
| 79.05 | 100 | 0 | | |
| 79.04 | 100 | 0 | | |
| 79.03 | 100 | 0 | | |
| 79.02 | 100 | 0 | | |
| 79.01 | 100 | 0 | | |

Fig.3C

COMPUTERIZED METHOD AND SYSTEM FOR SCALE TRADING

CROSS-REFERENCE TO RELATED APPLICATION

This application is a continuation of U.S. patent application Ser. No. 12/251,316, filed Oct. 14, 2008, entitled COMPUTERIZED METHOD AND SYSTEM FOR SCALE TRADING, the contents of which are hereby incorporated herein by reference.

BACKGROUND OF THE INVENTION

Field of the Invention

The present invention relates to the field of securities trading systems and, in particular, to a computer-implemented system and method for scale trading.

Description of Related Art

A market participant that desires to sell or buy a large order of stock generally may not submit the order in one single order because exposing a large order often causes adverse price effects to the disadvantage of the market participant. Thus market participants employ various methods and strategies to minimize the adverse price effects.

Market participants (generically referred to herein as traders) cannot ensure that they successfully move a block order simply by attempting to camouflage it by breaking it up into individual, smaller lots and executing them over a period of time so as not to move the market. There is a risk that parasitic traders will detect the pattern of small lots and trade in the same direction of the large, block order. Furthermore, breaking up the order into multiple trades also requires significant time, effort and monitoring. A market participant breaking a block order into multiple smaller orders is also subject to technological limitations. For example, in trading systems where the market participant (also referred to herein as a trader) transmits orders via an electronic communications network, the trade orders are subject to interruptions in communications, which may cause certain of the multiple orders to be lost or delayed. Additionally, as the number of orders increases, the potential for errors in tracking such orders increases.

Another method employed by market participants is the use of sophisticated order types. Some market places allow participants to conceal large orders with the use of so-called "iceberg" orders. Iceberg orders allow market participants to publicly display only a small portion of their order while hiding the rest. An iceberg order is a limit order that has both a displayed portion and a non-displayed portion, both of which are available for execution against incoming marketable orders. The non-displayed portion is available for execution only after all of the displayed portion has been executed. Iceberg orders can take longer to fill and the entire order gets filled at or near the same price level of the non-displayed portion.

Another method used by market participants is sending the block order to block crossing networks. These crossing networks are dark liquidity pools that match contra orders. A successful match is dependent on the depth of liquidity in the particular security on the network. Thus, large block orders may take unduly long to execute, if at all.

Thus, a need exists for an improved method and system for trading, particularly large block orders.

SUMMARY

These and other needs are satisfied by the embodiments disclosed herein. In general, embodiments described herein include computer-implemented methods and systems that permit a market participant (also referred to herein as a trader) to automatically scale a block order into relatively smaller, incrementally-priced scale trade component orders based on scale order parameters (such as price and size) provided by the market participant until the total number of shares specified by the market participant is accumulated or sold. Some embodiments also permit the market participant to automatically submit opposite-side profit-taking component orders against the market participant's original scale order components. The profit-taking orders can be automatically created and submitted when the original scale order component has executed.

Other optional features discussed herein may be combined with such automatic creation of scale component orders and profit-taking orders. Such other features include the ability to restore quantities of filled profit-taking orders to the quantity of scale component orders to be filled. Another optional feature is the ability to instruct the system to restart the scale trade from an intermediate state, for example where a portion of the initial scale component or a portion of the scale components have been filled.

BRIEF DESCRIPTION OF THE FIGURES

By way of example, embodiments of the invention will be shown in and described with reference to the accompanying drawings, in which:

FIG. 2 is a screen shot of a trader terminal in accordance with an embodiment of the present invention;

FIGS. 3a-c are screen shots of a trader terminal in accordance with an embodiment of the present invention;

DETAILED DESCRIPTION OF EMBODIMENTS

In general, certain computer-implemented embodiments of the invention permit a market participant to automatically scale a block order into relatively smaller, incrementally-priced scale trade component orders based on scale order parameters (such as price and size) provided by the market participant until the total number of shares specified by the market participant is accumulated or sold. The market participant can initiate the orders being submitted to electronic marketplaces as limit or relative (also referred to as pegged to primary) orders. Some embodiments also permit the market participant to automatically submit opposite-side profit-taking component orders against the market participant's original scale order components. The profit-taking orders can be automatically created and submitted when the original scale order component has executed. Other optional features discussed herein may be combined with such automatic creation of scale component orders and profit-taking orders.

As will be apparent to those skilled in the art based on the present disclosure, various embodiments of the present invention offer one or more advantages over, and solve one or more business and technical problems associated with, prior trading systems and methods. For example, embodiments of the present invention prevent deteriorating prices by automatically submitting a large order in smaller increments with increasingly better prices, which decreases adverse price effects. Also, embodiments automatically enable market participants to achieve a lower cost-basis by building a position by buying a security over time at increasingly better prices. Embodiments of the invention may also avoid bandwidth limitations and communication interruptions by automatically splitting a large order into multiple orders based on as few as a single order transmission. Embodiments may also automatically generate and submit profit-taking orders, thereby reducing exposure and allowing position traders to pre-define the minimum amount of profitability acceptable for exiting a position. In certain embodiments incorporating profit-taking orders, profit-taking parameters may be included in the same order transmission(s), which also avoids issues associated with limited bandwidth and communication interruptions. Also, embodiments of the present invention minimize the amount of human intervention required to trade block orders, thereby reducing costs and errors.

Figure 1:
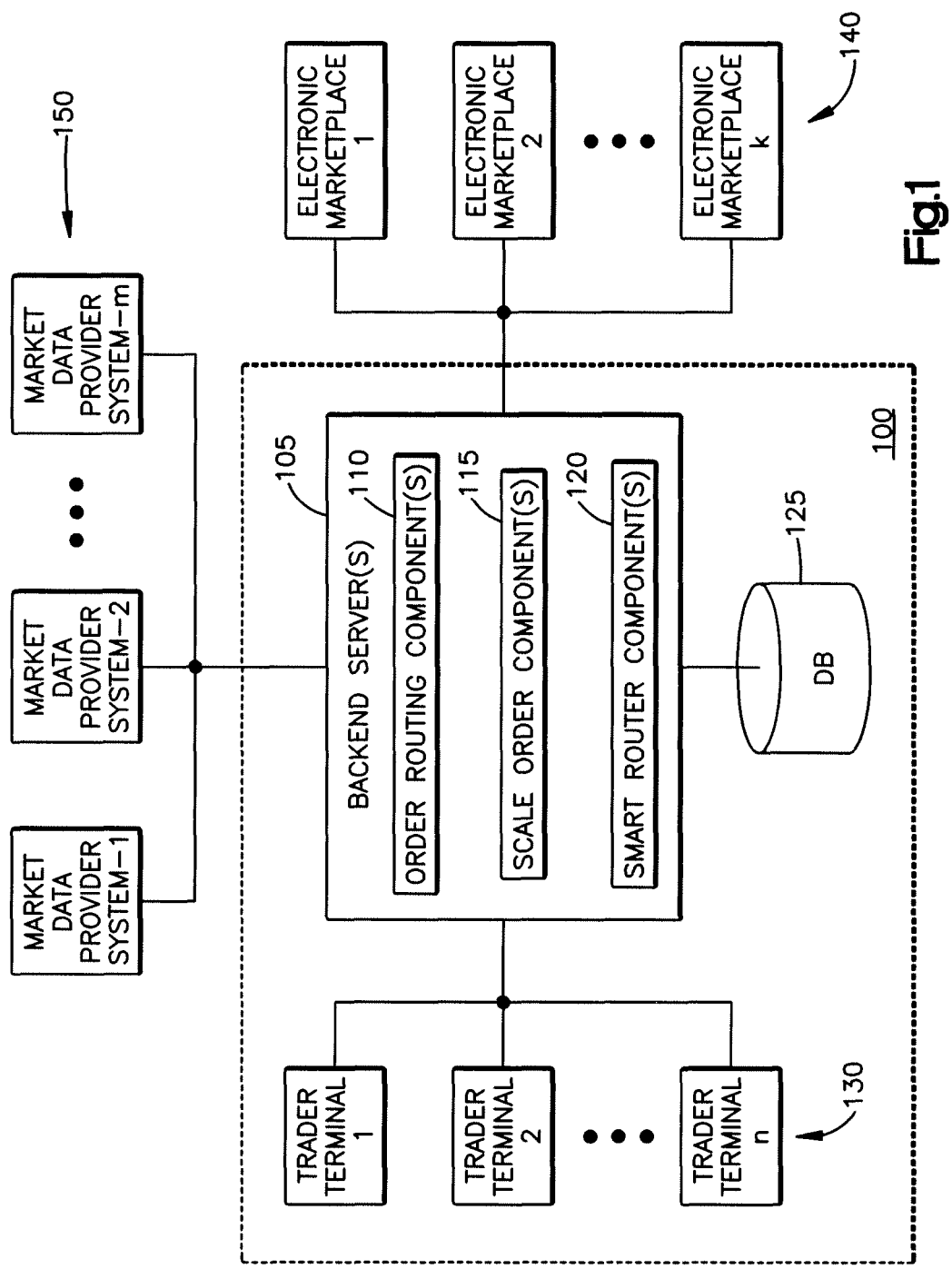
FIG. 1 is a schematic diagram of a computer-implemented trading network in accordance with an embodiment of the present invention.

Various embodiments of the present invention will now be described in greater detail with reference to the aforementioned figures. Turning first to FIG. 1, there is shown an embodiment of a computer-implemented trading system 100 generally comprising one or more backend servers 105 and trader terminals (1, 2, . . . n) 130. In general, the backend servers 105 serve as an intermediary between trader terminals 130 and electronic marketplaces (1, 2, . . . k) 140, receiving trade order details from the trader terminals 130, processing them, and submitting trade orders based thereon to the electronic marketplaces 140. The backend servers 105 also receive order execution information from the electronic marketplaces 140, process the execution information, and provide execution details to the trader terminals 130. In performing such functions, the backend servers 105 also receive and utilize market data, such as current market prices for securities, received from market data provider systems (1, 2, . . . m) 150.

It is to be understood that the present invention is applicable to various types of securities, such as stocks, bonds, fund shares, including mutual funds and exchange traded funds, future contracts, options, foreign exchange, and other financial instruments and products. Accordingly, the electronic marketplaces 140 may include any market or exchange for the trading of securities, such as that provided by the New York Stock Exchange Euronext, Chicago Mercantile Exchange (CME), Nasdaq, New York Mercantile Exchange, FTSE, Electronic Communications Networks (ECNs), liquidity pools, such as those operated by POSIT and LIQUIDNET, and others.

In providing the functions described herein, the backend servers 105 include processors that operate in accordance with software, firmware or other computer program stored on a computer readable medium, such as read only memory, hard disks (e.g., in a RAID configuration), tape drives, flash memories, optical disks, network storage or other known or hereafter developed technology. The servers 105 (and the processors thereof) may be configured to operate in accordance with software, which may be configured or organized to comprise various functional components or modules. In addition to those components of electronic trading systems and communication systems generally known to those skilled in the art, servers 105 may include one or more order routing components 110 and scale order components 115 and smart router components 120. In general, the order routing components 110 provide the functionality to intercept the orders transmitted by the trader terminals 130 and received by the servers 105 and the scale order components 115 generally provide the functionality to take the individual large block orders and generate multiple scale orders based on the scale order parameters. The scale order components 115 also similarly generate any profit-taking orders based on profit-taking parameters. The smart routing components 120 route the scale orders and profit-taking orders to the electronic marketplaces 140.

In performing the functions and operations described herein, servers 105 also access records and data in computer memory, such as random access memory, hard disks (e.g., in a RAID configuration), tape drives, flash memories, optical disks, network storage or other known or hereafter developed technology. By way of example, backend servers 105 include or are in communication with database 125. As will be apparent to those skilled in the art based on the description herein, database 125 may comprise a relational database having multiple related tables. In the present embodiment, database 125 stores order parameters typically stored in electronic trading systems and may include an account table, marketplace tables, a positions table, a scale trade order table, and a profit-taking order database.

In general, the account table stores information that identifies each market participant account, as identified by a unique account identifier (ID), and the associated market participant, including, for example, contact information, bank information, trading limits and any information deemed relevant, as well as an indication of the traders (and the associated trader terminals 130) trading under each account. For example, the system 100 may store limits restricting traders to trade in specific marketplaces and/or at specific times. Each trader terminal 130 may be identified by a unique terminal ID and/or IP address, and each trader may be identified by a unique user name and/or password, which the trader uses to log into the trader terminal 130. The backend servers 105 may use the terminal ID and the user name password to identify and associate incoming orders as being transmitted by a particular trader terminal 130 and trader, to process orders and to send outgoing messages to the appropriate trader terminal 130. The account holders and traders may include, for example, retail and individual investors, institutional investors, banks, market-makers, broker-dealers, or other entities.

One or more marketplace tables may include details regarding each of the marketplaces 150, as identified by unique marketplace ID, such as contact and routing information, trading schedule and other information.

The database 125 may also include one or more tables for storing account and trader positions. Such tables may include an indication of the aggregate positions in each security for each trader and account. The database 125 may also include (based on scale component and profit-taking order IDs) the quantity traded for each separate scale component and profit-taking order, both as placed, as well as filled. By tracking the quantity filled at each price, the servers 105 can provide the information depicted in FIGS. 3a-c, discussed below. This also allows flexibility in determining the commission to be charged (e.g., on each component or profit-taking order or on the overall scale order).

Database 125 may also include one or more tables for storing trade and order details. For example, the database 125 may include a scale trade order table, which associates scale orders with traders and/or accounts. Each scale order may have a unique associated order ID. The same or one or more other tables may include the scale order parameters associated with each scale order, as identified by order ID, such as those parameters illustrated in FIG. 2, discussed below. Such tables may also track order parameters not necessarily provided by the trader, such as the status of each order (for example, whether it is open or filled or to be cancelled or revised) and the details associated with the placing of the order (for example, the particular electronic marketplace 140 on which the order is placed, the time of the order and other details).

The database 125 also tracks profit-taking trade orders, and thus includes one or more profit-taking tables that associate profit-taking component orders with traders and/or accounts, as well as storing the profit-taking order parameters, such as those shown in FIG. 2. For example, as with scale trade order tables, each profit-taking order has a unique ID that is associated with the appropriate trader ID, trader terminal ID and/or account ID. Each profit-taking order is also associated, based on its ID, to the profit-taking order parameters associated with the order. In addition, the same or one or more other tables may separately correlate each profit-taking order to the scale trade order to which it is related. Each scale order record includes the related profit-taking order ID, and each profit-taking order record includes the related scale order ID, thereby allowing each of the scale order side and profit-taking order side of a scale trade to be associated with each other. Such profit-taking order tables may also track order parameters not necessarily provided by the trader, such as the status of each order (for example, whether it is open or filled or to be cancelled or revised) and the details associated with the placing of the order (for example, the particular electronic marketplace 140 on which the order is placed, the time of the order and other details).

It should be understood that the foregoing tables are merely illustrative, and that more or less information may be stored and tracked by the servers 105 and/or system 100 as may be desired. Furthermore, such data may be stored in any grouping and in any number of databases and/or tables, including storing information remote from the servers, such as at the trader terminals 130. Additionally, rather than storing all information, certain information may be generated in real time based on other information available to the system 100.

It should also be recognized that the computer systems described herein, such as the trader terminals 130, servers 105, electronic marketplaces 140 and market data provider systems 150, generally include one or more computers that are programmatically structured, to perform the functions required to manage their operations, as described herein. One skilled in the art will recognize that the computer systems may, as a matter of design choice, include any number and configurations of discrete computers and databases, which may be used separately or in tandem to support the traffic and processing needs necessary in operation at one time. In one embodiment, the backend servers 105, if multiple servers are used, are configured using a round-robin configuration to handle trader and/or electronic marketplace. Although not depicted in the figures, the one or more computers of the computer systems generally include such components as are ordinarily found in such computer systems, including but not limited to processors, RAM, ROM, clocks, hardware drivers, associated storage, and the like.

In general, each trader terminal 130 may be a programmed general purpose computer, specialized computer or other processing device (such as a PDA or other mobile device) that operates according to software, firmware or other program stored on a computer readable medium to provide the functions described herein. For example, each trader terminal 130 may be programmed to provide a number of graphical user interfaces (GUIs) to the traders such that traders can interact with and use the functions provided by system 100 and servers 105. These GUIs may include order entry tickets (as shown in FIG. 2), order tracking screens (as shown in FIGS. 3a-c), account or position information, pricing tables, charts, market data and other information desired by the trader or stored by the system 100. In the present embodiment, the trader terminal is a Java-based GUI that packages information and transmits it to the server 105 as an extension of the FIX protocol.

Furthermore, each of the servers 105, trader terminals 130, electronic marketplaces 140 and market data provider systems 150 described herein may have a network connection over which each communicates with the other components as described herein. The network connection may be a gateway interface to the Internet or any other communications network through which the systems can communicate with other systems and user devices. The servers 105 may communicate with each of the other types of components over the same network, such as the Internet, or over separate networks, such as the Internet, WANs, LANs, VPNs or other communication link. Network connection may connect to the communications network through use of a conventional modem (at any known or later developed baud rate), an open line connection (e.g., digital subscriber lines or cable connections), satellite receivers/transmitters, wireless communication receivers/transmitters, or any other network connection device as known in the art now or in the future. It will be understood by those skilled in the art that the display of user interfaces and the provision or display of information to a user may be accomplished within the scope of the present invention in a number of ways, including, but not limited to, the serving or pushing of interfaces to a user, exposing one or more application programming interfaces (APIs) to the trader terminals 130, and the local storing and/or generation of interfaces at a trader terminal 130 upon a trigger received from the servers 105 or input from the trader at the trader terminal 130. Also, the backend servers 105 may communicate with the trader terminals 130 and electronic marketplaces 140 using any protocol or format. In certain embodiments, the computer systems involved preferably communicate using a messaging system in which information be communicated is contained within one or more messages, which may be packetized, encrypted or formatted, as necessary to address specific bandwidth or security concerns. The messages may use XML or other message types and may be based off of one or more message standards, such as FIX in the financial industry, or be based on a proprietary protocol or format.

It will be understood that reference to a "connection," "communication" or "link" is not intended to mean that the various computers be in constant connection or communication, but rather be capable of communication upon establishment of a connection. For example, a trader terminal 130 may from time-to-time "connect" to servers 105 using an unsecured Internet connection to check market prices or related information.

As noted above, each trader terminal 130 operates in accordance with software (for example, residing in local ROM) to provide the trader with a graphical user interface (GUI). As illustrated in FIG. 2, the GUI may include a scale trading order ticket 200 alone or among any of a number of different trading related options. In general, the scale trading order ticket 200 provides an interactive means for a trader to input details regarding scale orders, including the scale order parameters defining the scale trade orders. As illustrated, the order ticket 200 includes an indication of the direction of the order, namely whether the order is a buy or a sell 205, the symbol of the security being traded 210, and an indication as to whether the order is to be a limit or relative order 215. The trader may also select the period the order is effective 218, here either good till cancelled (GTC) or until the market closes (DAY). In the present embodiment, this selection is applied to both scale order components and profit-taking orders.

The order ticket 200 also includes various fields for the trader to input the scale trade parameters relating to size and price. In this regard, the order ticket 200 includes the following fields: total order size 220, which indicates the aggregate number of shares of the security to be traded or the maximum position to be accumulated in all scale component trades; the initial component size 225, which indicates the number of shares in the first scale order component; subsequent component size 230, which indicates the number of shares in the second and each subsequent component order making up the scale trade (which as a default may be equal to the initial component size); the starting price 235, which indicates the price at which the initial component offer will be made; and the price increment 240, which indicates the incremental price difference between each scale trade component and the prior scale trade component, such that each subsequent component is placed at an incrementally better price. It is to be understood that the aforementioned scale order parameters are merely illustrative, and other parameters are within the scope of the present invention. For example, rather than having both an initial component size 225 and subsequent component size 230 parameters, a single size for all components may be used or each scale component may be of a different size. Also, although a single price increment 240 is described, it is within the scope of the present invention to provide the trader with greater flexibility in setting the price increments, including setting a different price increment for one or more of the different scale order components. Also, although the price increment 240 is illustrated as an absolute dollar amount, it may be other indications of price increments, such as percentage of the starting price 235 or the price of the preceding component. Also, the price of a component may be based not on a price set by the trader, but on the National Best Bid and Offer (NBBO) or other price in effect at the time of pricing the component order, as is the case when a "Relative" order is placed. Furthermore, the trader may be given the option to select a particular marketplace 150 and/or to trade at specific time(s).

Also as part of the order ticket 200, the trader may input profit-taking order parameters. In the present embodiment, the trader may indicate a desire to create profit-taking orders via a radio button or the like 245. In the event that profit-taking orders are to be created, the trader may also enter a profit offset 250, which defines the minimum acceptable profit to be met to close the trader's position in each component of the scale order. As will be described in greater detail herein, when the option to create profit-taking orders is selected, the system 100 generates and submits to the electronic marketplaces 140 opposite-side limit order components of the same quantity against filled scale order components. The price per unit of the profit-taking order is set by adding (in the case of buy scale components) or subtracting (in the case of sell scale components) the profit offset 250 from the scale order component price per unit that the profit-taking order is offsetting.

The profit-taking order parameters may also include an indication 255 of whether to restore the total scale order size 220 after filling a profit-taking order. As described in greater detail herein, when the option to restore the size after taking a profit option 255 is selected, the system 100 will continually restore to the original scale order a quantity equal to each filled profit-taking order. The replenished order will continue to work and fill until it is cancelled (good till cancelled (GTC)) or until the market closes (DAY), as selected by the trader in this embodiment.

Thus, as reflected in the order ticket 200 of FIG. 2, the trader has entered a limit order to buy 1000 shares of DRYS in scale components of 100 shares each, beginning with a starting price of $79.10, at a price increment of $0.01. In the present example, the trader has indicated profit-taking orders should also be generated with a price offset of $1.00 (i.e., beginning at $80.10).

It should be understood that Order Ticket 200 is merely illustrative. For example, fewer or greater details may be inputted and collected depending on the flexibility desired to be provided to the trader. In this regard, the system may set the size of the initial or all components, the price increment (or a minimum and/or maximum price increment), as well as other details. The order ticket need not include data entry fields, but may provide the trader with the option to select from predefined details, such as one of many potential component sizes, price increments and/or profit offsets. Furthermore, the order ticket 200 is merely illustrative of the means for a trader to input order details, and other such means are within the scope of the present invention, including a voice recognition system, which automatically prompts the trader to speak the order details and converts the voice inputs to an electronic message or system inputs and merely providing the order details via a voice or other connection to a system administrator, who enters the necessary order details via a computerized data entry device in communication with the servers 105. Such voice recognition and computerized data entry devices, as well as other devices used to communicate the order details to the system, are encompassed within the term trader terminal despite not necessarily being physically located at or under the direct control of a trader.

As noted above, the trader terminals 130 includes software which configures the trader terminal 130 to generate a GUI which may also include a scale progress screen 300, as illustrated in FIGS. 3a-c. The scale progress screen 300 may include an indication of the scale orders 305, in the present example, "BUY 1000 DRYS @ 79.10 100×–0.01×1.0," indicating a scale order to buy 1000 shares DRYS starting at $79.10, in components of 100 shares each, with a price increment of $0.01, with a profit-taking offset of $1.00. The scale progress screen 300 also includes an indication of the scale orders 310, in this case buy orders of 100 shares each, and an indication of the profit-taking orders 315, in this case sell orders. The price of each of these scale components and profit-taking components is also indicated 320. Thus, referring to FIG. 3a, each of the ten buy components of 100 shares each is indicated as being open although not necessarily active. The price of the initial component is $79.10, with each subsequent component having an incrementally better price at a $0.01 price increment. In the present embodiment, the orders are placed serially, with the highlighted component (i.e., buy at $79.10) being the only active components, although it is within the scope of the present invention to have multiple active components, such as components placed concurrently. In the present embodiment, if a component becomes unmarketable, all subsequent orders wait until the component price becomes marketable.

Turning to FIG. 3b, there is shown the ten component buy orders 310, as well as five sell profit-taking orders 315. There are five profit-taking orders 315 because in the present example five of the buy component orders have been filled, as indicated in the scale progress screen 300. Notably, each of the five profit-taking orders 315 is at a price equal to the corresponding one of the five filled buy components plus the $1.00 profit offset. As illustrated, the quantity of each of the filled buy components (500 shares) has been added to the profit-taking orders (five orders of 100 shares each), although in alternate embodiments this need not be the case. As with the scale components, the profit-taking components are placed serially, with the active component highlighted, although in alternate embodiments, multiple profit-taking components may be active concurrently.

As illustrated in FIG. 3c, four of the five sell profit-taking orders have been filled, each at an incrementally better price. In the present example, the restore size after taking profit option (255 of FIG. 2) has not been selected. Accordingly, the 400 shares of filled profit-taking orders have not been added back to the scale components, leaving only the remaining buy scale components. If the restore size after profit-taking option 225 was selected the 400 shares of filled profit-taking components would have been added back to the scale components, resulting in four, 100-share scale component buy orders.

As noted above, the system 100 of the present embodiment includes trader terminals 130 and one or more backend servers 105, each of which operates in accordance with software, firmware, or other computer program stored on computer readable medium to achieve the functionality and implement the processes described herein. In this regard, the functionality and processes of the present embodiment will be described in greater detail with reference to FIGS. 4 and 5 and continuing reference to FIGS. 1-3c.

Figure 4:
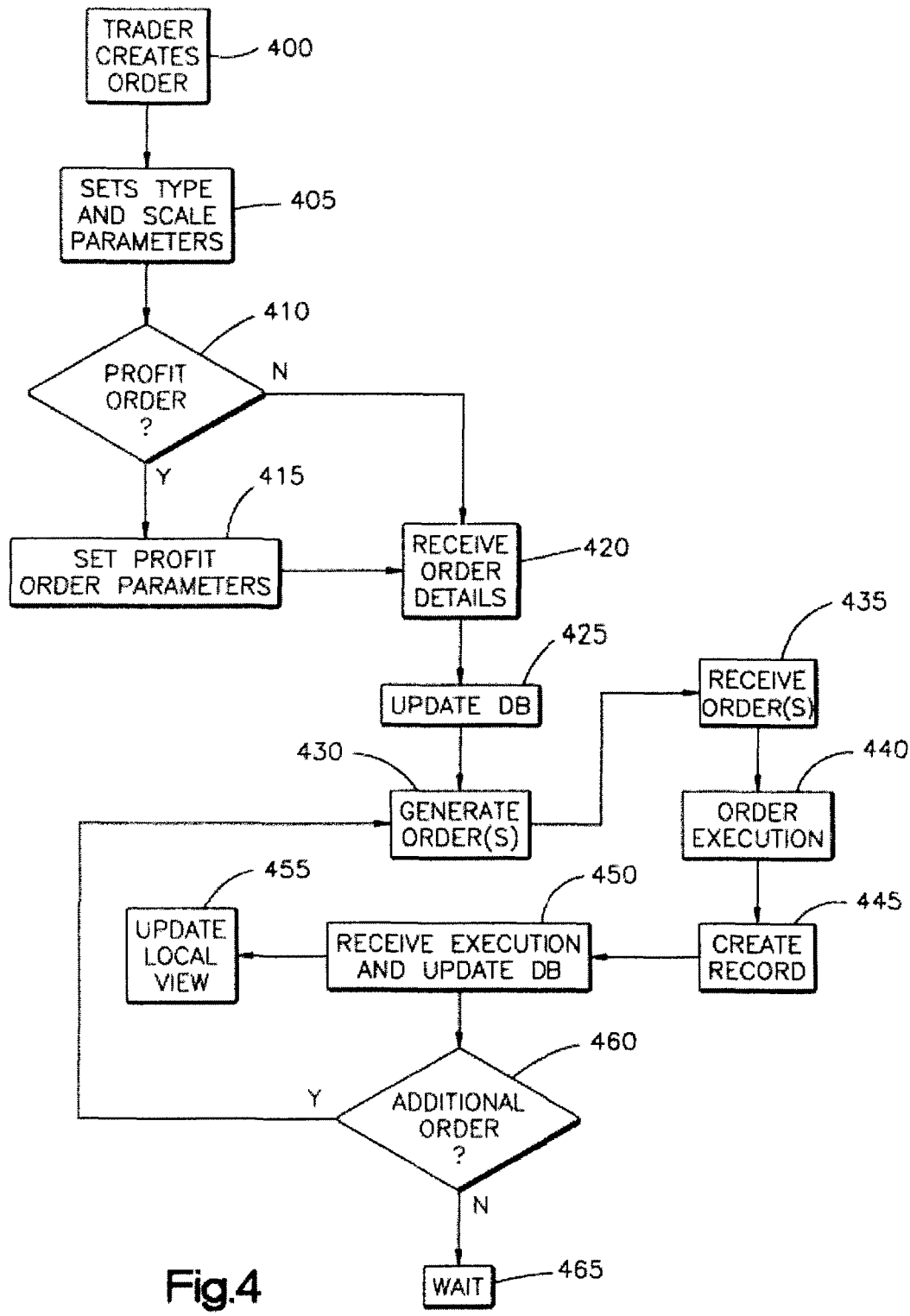
FIG. 4 is a flow diagram of the order creation and routing process in accordance with an embodiment of the present invention.

Turning first to FIG. 4, the general process of order creation and execution will now be described. In general, the steps of the flow chart of FIG. 4 appearing on the left are those performed at or by the trader terminals 130, those illustrated in the center are performed at or by the backend servers 105, and those illustrated on the right are performed at or by the electronic marketplaces 140. As an initial step (not illustrated), an account holder opens an account with the provider of the system, providing the account details, the backend servers 105 create the appropriate records in the database 125 for the account and the account holder obtains one or more trader terminals 130 which as noted above, may be a special purpose computer or programmed general purpose computer. Once the account is opened and the trader is authorized to trade, the trader creates the order (step 400), including setting the type of order and the scale trade attributes (step 405) via the order ticket 200. If the trader indicates that profit-taking orders are to be included (step 410), then the trader proceeds to set the profit-taking order attributes (step 415). Once the trade details including the scale order parameters and any profit-taking parameters, are set, the trader submits the trade (e.g., by activating a "transmit" button on the order ticket), and the trader terminal 130 transmits the order details to the backend servers 105.

The backend servers 105 receive the order details (step 420) and update the database 125 (step 425). Such updating of the database 125 may include creating records containing the trade details and associating such details with a particular trader and account. Such updating may also include determining and storing each of the particular scale order components, including any profit-taking components comprising the order (e.g., subtracting the initial component size 225 from the total order size 220 and dividing the result by the subsequent component size 230 to determine the number of subsequent components), although the backend servers 105 may determine the various details of the components in real time, based on the order details and not separately store records for the individual components. The backend servers 105 proceed to generate the order (step 430) and submit the necessary component(s) to the electronic marketplaces 140.

Once the backend servers 105 transmit an order to a particular electronic marketplace 140, electronic marketplace 140 receives the order (step 435) and proceeds to execute the order by matching it against a contra order (step 440). Electronic marketplace 140 then creates an electronic record (step 445) reflective of the execution of the order and transmits the indication that the order has been executed to the backend servers 105.

The backend servers 105 receive the indication that the component order has been executed and update the database 125 (step 450), including noting the trade details, such as the quantity and price at which the trade was filled, and changing the status of the order to "filled." As discussed above, filling a scale component may result in updating the database 125 to reflect an offsetting profit-taking component. Similarly, if the restore option 255 is selected, filling a profit-taking component will result in updating the database 125 to reflect the need to fill an additional quantity of the scale order, which could be accomplished by decreasing the aggregate filled scale component quantity by an amount equal to the quantity of the filled profit-taking component. The backend servers 105 then determine whether an additional order needs to be placed to complete the trader's total order (step 460). As discussed in greater detail herein, this determination of whether there are additional component orders to be placed includes determining whether additional scale components and/or profit-taking components need to be placed. In this regard, for example, the servers 105 compare the total order size to the aggregate quantity of filled scale components quantities associated with the order, which is stored in the database 125. If additional orders are to be placed, then the servers 105 generate such orders (step 430) and a process repeats. If no additional component orders need to be placed to completely fill the original order, then the order is completed, and the servers 105 wait for another order (step 465).

When the servers 105 receive execution information from the electronic marketplace 140, the servers 105 also generate a message containing such execution information and, for example, based on the trader terminal ID or IP address associated therewith, transmit the execution information to the trader terminal 130 from which the order was received. To reduce necessary bandwidth, the messages transmitted from the servers 105 to the trader terminal 130 may include the trader ID and execution information, such as price and size, as well as an indication the scale order to which the execution information belongs, rather than all details necessary to define the scale order. For example, each message may include an identifier indicating that the execution details relate to a particular one (i.e., first, second, etc.) scale component of a particular scale order, thereby allowing the message to be made relatively smaller. Upon receipt of the information, the trader terminal 130 extracts the information and updates the local view presented to the trader in the trader terminal GUI (step 455).

Having thus described the general operation of the system 100, the process of creating, submitting and executing the scale components and profit-taking components will now be described in greater detail with reference to FIG. 5. Having received the trade detail, including the scale component parameters and any profit-taking parameters, the backend servers 105 proceed to determine the number of components and the price in which each component is to be placed (step 500). For example, the number of components is determined by subtracting the initial component size 225 from the total order size 220. The result is then divided by the subsequent component size 230, to determine the number of subsequent components. The number of subsequent components plus the initial component equals the total number of components. The price of each component is determined by taking the starting price 235 and subtracting the price increment 240 where the scale order is a buy and adding the price increment 240 where the scale order is a sell, to each component. The servers 105 then proceed to update the database 125 by creating records corresponding to each of the components, generating the initial scale order component and transmitting the component order to an electronic market place 140 (step 505). The servers 105 then update the status of the component order in the database 125 and wait for the component to trade (step 510).

When the component order executes, the servers 105 receive the execution information from the electronic market place 140 and process the trade, updating the database 125 to reflect the execution details, including noting that the initial scale component has been filled (step 515).

Once the initial scale component is filled, the servers 105 determine whether profit-taking components are to be generated and, if so, generate them. More specifically, the servers 105 determine whether the profit-taking option 245 was selected (step 520), for example, by evaluating whether the profit-taking order flag has been set in database 125 for the scale order. If the profit-taking option 245 was not set, the profit-taking process ends (step 525). However, if the profit-taking option 245 was set, and profit-taking components are to be generated, then the servers 105 generate the initial profit-taking component based on the filled component price and size and the profit offset 250, transmit the corresponding profit order to an electronic market place 140 and updates the database 125 to reflect the profit-taking order being transmitted (step 530).

In the present embodiment, essentially simultaneous to the servers 105 generating and transmitting the profit-taking order, the servers 105 also generate and transmit the next scale order component and update the database 125 accordingly (step 535). To generate the next scale component, the servers 105 access the database 125 and identify the subsequent component size 230 associated with the scale order and determine the price based upon the starting price 235 and price increment 240. As noted above, the servers 105 may generate these details and real time for may generate them upon receipt of the scale order details and store the scale components parameters in the database 125 ahead of time.

If a component or profit-taking order is to be cancelled or revised to be smaller in size, the servers 105 may cancel or revise the existing order before placing the opposite side order (i.e., scale component in step 535 or profit-taking order in step 530) so that the system does not trade the two sides with each other.

Once the profit-taking order component and the next scale component are transmitted to electronic market places (which may be the same or different), the servers wait for each trade to execute (step 540). As each component executes, the servers 105 receive execution detail from the one or more electronic market places 140, process the trade and update the database 125 accordingly (step 545). Updating the database 125 may entail identifying the particular component as having been filled and, in the case of the scale order component being filled, updating the aggregate quantities of scale components filled. The servers 105 then proceed based on a determination of whether a scale or profit component was filled (step 550).

If a scale component was filled, the servers 105 proceed to add the quantity filled to the quantity to be placed as part of the profit-taking components (step 555) by updating the database 125 to reflect additional profit-taking components. In various embodiments, adding the filled quantity to the profit-taking orders may entail keeping a pending profit-taking order or canceling a pending profit-taking order and submitting a new profit-taking order. The servers 105 then determine whether the scale components are complete (step 560). This may entail determining whether the specific outstanding scale component was filled in its entirety, as well as determining whether any additional scale components need to be generated and transmitted to the electronic market places 140. Such determination may be made by analyzing the appropriate records in the database 125, including comparing whether the quantity of the scale component equals the quantity filled (although in certain embodiments, no partial fills of components are allowed), as well as comparing the aggregate quantity of filled scaled components to the total order size 220. If the scale components are complete, then the servers 105 again wait (step 540) for any quantity being added to the scale components by virtue of profit-taking components being filled (as discussed below with respect to step 565). However, if the servers 105 determine that the scale components are not complete, then the servers 105 proceed to generate and transmit the next scale component and update the database 125 accordingly (step 535), and the process continues as described.

When the servers 105 receive execution of a profit-taking component, the servers 105 proceed to add the quantity of the filled profit-taking component back to the scale order if the restore size option 255 has been selected (step 565). In certain embodiments, the servers 105 also cause the last scale component order submitted for trading to be cancelled, which reduces processor and bandwidth usage, as the number of orders being worked is reduced. In other embodiments, the last scale component is not cancelled if the marketplace 150 is near its closing because near closing, prices tend to move more quickly and there can be a greater likelihood of execution at different price levels. Adding back to the scale order the quantity filled in the profit-taking order can be accomplished in any of a number of ways, including reducing the aggregate filled quantity of scale order components, as tracked by the servers 105 in the database 125, or by increasing the total scale order size 220. The servers 105 then proceed to determine whether the profit-taking components are complete (step 575). Similar to the scale component process, determining whether the profit components have been completed may entail determining not only whether an individual profit-taking component has been completely filled (although in certain embodiments no partial fills are permitted), but also whether all profit components have been filled. These determinations may be made by comparing the quantity of the profit component with the quantity indicated as having been executed, and by comparing the aggregate quantity of filled profit components as stored in the database 125 to the aggregate quantity of filled scale components, respectively. If the profit components are complete, then the servers 105 again wait for any additional quantity being added to the profit-taking components by virtue of a scale component being filled (as described with respect to step 555). If the profit-taking components are not completed, then the servers 105 proceed to generate and transmit the next profit component at a price equal to the fill price of the last scale component plus (or minus where the scale order is a short sale order) the price offset and update the database 125 accordingly (as described in step 530), and the process continues.

Where the type of order is "Relative," as opposed to "Limit," the servers 105 submit the scale component orders to the electronic marketplaces 150 as such, so that buy orders may fill below the limit price and sell orders may fill above the limit price (e.g., the NBBO minus or plus the price increment, respectively). Although relative orders may increase profitability of a buy execution, there use risks missing some trades. In the present embodiment, the prices at which relative scale components are executed do not affect the prices at which subsequent components are submitted.

Figure 5:
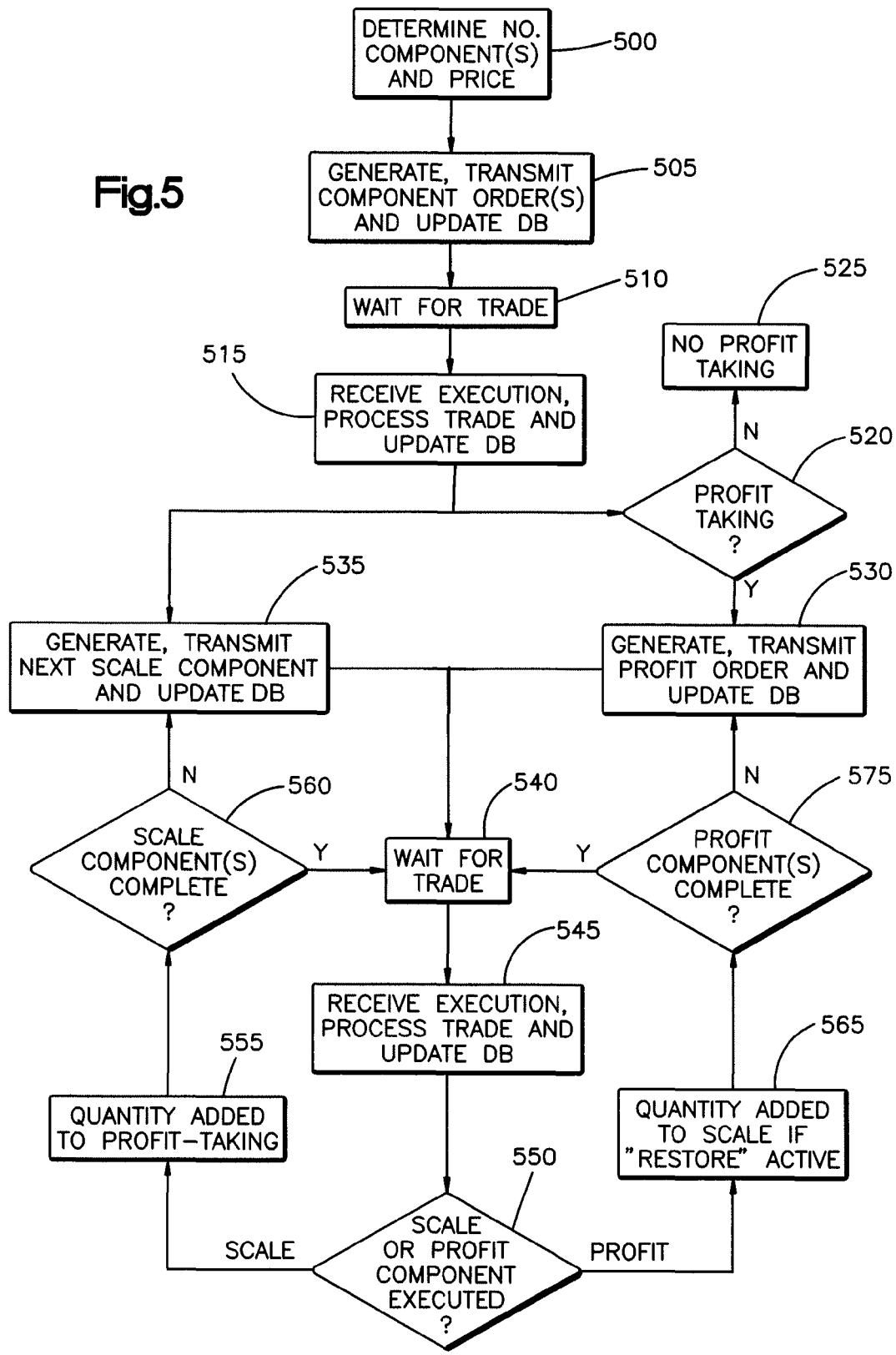
FIG. 5 is another flow diagram of the order creation and routing process in accordance with an embodiment of the present invention.

As will be understood by those skilled in the field, the logical flow of FIG. 5 may be implemented programmatically in several ways. Thus, the generation and submission of scale components and profit-taking orders may be logically thought of as occurring essentially in parallel, the servers may be programmed to perform the steps serially, for example, generating and submitting a subsequent scale component, then a profit-taking order, then receiving execution information and if a scale component was executed, adding the filled quantity to the profit-taking order (or canceling an existing profit-taking order and submitting a new profit-taking order) and, if a profit-taking order was filled (and the restore option selected), adding the quantity back to the scale order.

It should be understood that the servers 105 may programmatically determine the currently desired scale position range according to different algorithms, including the following algorithm, in which CP is the current position (CPmin being the minimum potential position and CPmax being the maximum potential position); IPOS is the initial position; AQ is the additional quantity; IP is the initial price; PI is the price increment; LP is lowest price of the scale component that has traded; HP is highest of the profit taker component that has traded; Pr is the profit-taking offset; and MAXPOS is the maximum position for or total size of the scale order.

For scale orders without the "restore size" feature active, the servers assume LP=IP if scale order did not trade, and HP=LP+Pr if no profit-taking order traded. ABS is the absolute value function, used below to accommodate sell orders. The actual position is defined by the formula:

CP=IPOS+AQ*ABS((IP−LP)/PI)−AQ*ABS((HP−(LP+Pr))/PI).

The result can be off from the actual current position by up to AQ due to partially filled levels, but, as discussed herein, the servers can account for this.

For scale orders with the restoring option active: LP is redefined to be the lowest price of the not currently placed order for one share (i.e., the price at which the next scale order component would have been placed had the profit-taking order filled one share, or IP, if no profit-taking component is currently placed); HP is redefined to be the highest price of the not currently placed profit-taking order, or IP+Pr−PI, if scale order has not traded; and HPmax is the maximum price at which a profit-taking order can be placed. Thus, HPmax=IP+Pr+ROUNDUP((IPOS−AQ)/AQ,1)*PI), where ROUNDUP(X, Y) rounds X up to a multiple of Y;

CPmax=IPOS+AQ*ABS((IP−LP)/PI);

CPmin=AQ*ABS((HPmax−HP)/PI); and

0<=CPmin<=actual CP<=CPmax<=MAXPOS.

The servers may also invert these formulas for scale orders with the restore feature selected by putting actual scale trader position in the left hand side and obtaining LP and HP, which then can be used as prices of scale order and profit-taking orders, respectively. The servers may also look at the remainder obtained when dividing by AQ while inverting the formulas (i.e., CP-IPOS divided by AQ), or actual CP if CP is less than IPOS, to obtain the size of the scale order component and profit-taking component orders that have been partially filled at the current price level. Once LP and HP are obtained, the servers can calculate the price of the order placed by checking whether the component level is filled or not and adjusting the price by PI if a component is to be placed at the next price level. In the formulas above, if the initial position, IPOS, has not been fully established (i.e., filled), the servers replace IPOS with the actual position established. Referring to Example 5 (below), the servers would be using IPOS=1200.

These formulas may be further explained with reference to the illustrative examples shown in FIGS. 3a-c, where: IPOS=100; AQ=100; IP=$79.10; PI=$0.01; and Pr=$1.00.

FIG. 3a shows an initial state, with the initial scale component order to buy 100 shares at $79.10 placed. LP=$79.10; HP=IP+Pr=$80.10 since CP=0. Since IPOS was never established, we use IPOS=0 in the formulas. Thus,

CP=0+100*((79.10−79.10)/0.01)=0;

HPmax=79.10+1.00+0=80.10; and

CPmax=CPmin=0

The example of FIG. 3b shows CP=500 and LP=$79.06. If we consider this as a non-restoring scale order, HP=$79.06+1.00=$80.06, and

CP=100+100*((79.10−79.06)/0.01)−100*0=100+400=500.

If the example is considered a restoring scale order, LP=$79.06, HP=$80.05, and

CPmax=100+100*((79.10−79.06)/0.01)=100+100*4=500;

HPmax=79.10+1.00+0=80.10; and

CPmin=100*(80.10−80.05)=500.

In another example similar to that of FIG. 3b, assuming the restore feature is active and that one share was executed on a profit-taking order that was placed to sell 100 shares at $80.06, LP=79.06, HP=80.06, and CPmax=500 (i.e., unchanged); and CPmin=100*(80.10−80.06)/0.01=400.

The real CP is 499; however, the formulas merely indicate that it is between 500 and 400. Any quantity of shares between 1 and 99 could have been traded on this profit taker of 100 shares at $80.06, with no calculated effect on LP or HP. However, because the servers track the filled quantity, the actual position can be determined to be 499, and inverting the formulas permits the servers to determine that LP=$79.06, HP=$80.06.

The example of FIG. 3c shows: CP=500−400 (i.e., 100); LP=$79.05; and HP=$80.09. For the case of a scale order without the restoring option active:

CP=100+100*((79.10−79.06)/0.01)−100*(80.09−(79.05+1.00))=100+400−400=100.

For a scale order with the restore feature active, LP=$79.10, HP=$80.09 and

CPmin=100+100*((79.10−79.10)/0.01)=100; and

CPmax=100*((80.10−80.09)/0.01)=100.

Although not separately identified in the flow charts of FIGS. 4 and 5, it is to be understood that orders may be subject to being cancelled by the servers 105 upon receipt of a cancel request from a trader terminal 130, as initiated by a trader or upon the end of a trading day with respect to a DAY order.

It should be emphasized that although various embodiments have been described with reference to an illustrative scale order in which the scale components are buy orders and the profit-taking components are sell orders, it is within the scope of the present invention for the scale components to be sell orders and the profit-taking components to be buy orders (e.g., for short sale trades). Furthermore, the profit-taking option (245 of FIG. 2) need not be offered and if it is, profit-taking components need not be selected as part of the scale order. Similarly, the restore size after profit-taking option (250 of FIG. 2) need not be offered, and if it is, need not be selected as part of the scale order.

To more fully describe the various types of scale order within the scope of the present invention and the operation of the system and servers 105, several additional, examples, which are not meant to be exhaustive, will now be discussed. Each of the following examples is based on the following scale order details: NBBO: $10.12-$10.15; Total Order Size: 10,000; Action: Buy Limit; Initial Scale Component Size: 2000; Subsequent Component Size: 1000; Price Increment: $0.01; Starting Price: $10.15; and Time in Force: GTC.

Example 1: Basic Scale Order

The servers 105 scale the order into nine components of 2000, 1000, 1000, 1000, 1000, 1000, 1000 and 1000. The first 2000-quantity component is submitted at the initial price of $10.15. After this component fills, the next component (1000) limit component order is generated and submitted at $10.14 (the initial price less the price increment of $0.01). The next component is submitted at $10.13; however, based on market information received by the servers 105, the servers 105 determines that price movement renders this component order unmarketable, and the servers 105 wait to submit the remainder of the scale order. Once the servers 105 determine that the component becomes marketable and is filled, and the servers 105 generate and submit the next component. This process continues until all components have filled, or the trader cancels the order, and the servers 105 receive the corresponding input from the trader terminal 130.

Example 2: Scale Order with Profit-Taking Components

This example is based on the foregoing order details and a profit offset of $1.00. The restore size after profit-taking option is not selected.

The order is scaled into nine components, as with Example 1, namely an initial component of 2000 and subsequent components of 1000. The first 2000-quantity component is submitted at $10.15. After this initial component fills (e.g., at $10.15), the next 1000 lot component is submitted at $10.14 (the starting price less the price increment), and profit orders of 1000 at $11.15 (the price at which the scale component filled (here, the starting price) plus the profit offset) and 1000 at $11.16 (the price at which the order was placed or, in alternate embodiments, the fill price, plus the price increment, plus the profit offset) are submitted. In the present example, the profit components are scaled to the subsequent component size although in alternate embodiments the initial profit component may be a single component of 2000. Furthermore, in the present embodiment, the second profit component is offered at a price better than the first profit component (by the price increment), although in alternate embodiments the second profit component may be offered at the same price as the first profit component (e.g., the price at which the order was placed or, in alternate embodiments, the fill price, plus the profit offset). Once the subsequent buy limit scale component at $10.14 fills, the next scale component is submitted at $10.13, and a 1000 lot sell limit profit component is submitted at $11.14 (the price of the just filled component plus the profit offset). Each subsequent profit-taking component is submitted at the price the most recent scale component filled plus the profit offset.

Note that because the trader has input the time in force as GTC, the sell orders work until the minimum acceptable profit amount for exiting the position is met.

Example 3: Scale Order with Profit-Taking Components and Restore Size Option

In this example, the profit offset is assumed to have been input as $1.00 and the restore size after taking profit option selected.

The order is scaled into nine components as in the previous examples. The initial 2000-quantity scale component is submitted at $10.15, the starting price. After the initial scale component fills (e.g., at $10.15), the next scale component—a limit order for 1000—is submitted at $10.14 (the starting price less the price increment), and a profit-taking components of 1000 at $11.15 (the price at which the scale component was placed or, in alternate embodiments, the fill price, plus the profit offset) and 1000 at $11.16 (the price at which the scale component was placed or, in alternate embodiments, the fill price, plus the price increment, plus the profit offset) are submitted. The first 1000 sell profit component fills at $11.14, thereby allowing the trader to take the profit, and the filled profit component quantity of 1000 is added back to the original order, causing the servers 105 to submit an equal quantity scale component (1000) at $10.15 (the starting price) and, in certain embodiments, to cancel the $10.14 scale component. The process continues with the servers 105 waiting for the scale component and the outstanding profit-taking component to fill. In certain embodiments, if the profit-taking order for 1000 shares at $11.16 fills, then the buy scale component at $10.16 is cancelled and a buy order is placed for 1000 shares at $10.15.

Example 4: Restart Scale Order

Although not required, some embodiments of the present invention also include an option to restart the scale trading of functionality. Referring back to the order ticket 200 of FIG. 2, the restart option 260 instructs the system 100 to treat the scale order as though the specified quantity of the order was already scaled into components, priced and filled as scaled components, and the processes continue based on those inputs. More specifically, the trader enters a quantity in the existing position field 265, which indicates the quantity already filled as scale components. The servers 105 calculate the profit-taking orders against this existing position size using the previously entered starting price 235, price increment 240 and profit offset 250. If the trader terminal 130 or server 105 determines that trader's existing position 265 is smaller than the initial component size 225, it activates the filled initial component size field 270 of the order ticket 200. The trader may enter the filled initial component size 270, which represents the filled portion of the initial component size 225. An example of the "restart" functionality being active will now be discussed.

In this example, the profit offset is assumed to have been input as $0.02 and both the restart scale trader option (260 in FIG. 2) and restore size after taking profit option (255 in FIG. 2) selected and active. Also, the example assumes the trader input an existing position value of 3000. The restart option helps a trader resume a busted scale order from the point of the bust or allows a trader to pause trading, for example, if the security is unable to be traded (e.g., short sales are restricted). A bust results in a lost connection between the scale and profit order processes, leaving two independent component orders. Selecting the restart scale trader option (260 in FIG. 2) allows the trader to (and causes the servers 105) to cancel these now separate component and profit orders and create a new scale order.

The existing position value of 3000 indicates to the servers 105 that the initial component of 2000 and the first subsequent component of 1000 both filled, at $10.15 and $10.14 respectively. Therefore, the servers 105 "restart" the scale order beginning with the next scale component—the third component in this example. The first buy component of the restarted scale order is for 1000, and is submitted at $10.13, the price at which the third component would have been submitted (i.e., the starting price less the price increment, less the price increment). The profit-taking orders are generated and submitted for 1000 at $10.17 (the price at which the scale order was placed or, in alternate embodiments, the fill price of the initial component, plus the price offset; $10.15 plus $0.02), 1000 at $10.18 (the price at which the order was placed or, in alternate embodiments, the fill price of the initial component, plus the price increment, plus the profit offset; $10.15 plus $0.01, plus $0.02), and 1000 at $10.16 (the price at which the order was placed or, in alternate embodiments, the fill price of the second scale component plus the profit offset; $10.14 plus $0.02).

Example 5: Restart Scale Order with Filled Initial Component Size

The present example is similar to Example 4; however, when the trader inputs an existing position value that is less than the initial component size, the trader terminal recognizes it and prompts the trader to input the filled initial component size value (270 in FIG. 2), which indicates the quantity of the initial component filled prior to the bust. The filled initial component size value must be greater than or equal to the existing position value, up to a maximum of the initial component size. In this example, the existing position value is 500, and the filled initial component size is 1200.

Based on the filled initial component size of 1200, the servers 105 determine that there is an unfilled quantity of 800 (i.e., by subtracting the filled initial component size from the initial component size; e.g., 2000 less 1200). Thus, the servers 105 generate and submit a first buy component order for 800 at $10.15 (the initial component price), and profit-taking orders of 1000 at $10.17, which offsets the first 1000 filled of the initial scale component, and 200 at $10.18, which offsets the remaining 200 filled of the initial scale component. In certain embodiments, where the initial component is not fully filled and the scale order is restarted, the system may submit the profit-taking orders at other prices, for example, beginning with the lowest price at which a profit-taking order would have been placed had the entire initial scale component executed. The process continues as described above.

Embodiments may route orders to the marketplaces in any fashion. For example, orders may be routed to only a single marketplace, or to one of multiple marketplaces, for example, by randomly selecting the marketplace or using a round-robin or other methodology. Embodiments may use various forms of so-called "smart-routing," in which certain logic is used to select an appropriate marketplace. Whether or not smart routing is used, and the degree of processing and logic employed in any such smart routing, is a trade-off among several factors, including the potential for the best price, the processing overhead, speed of execution, bandwidth usage in routing orders and other factors. In one embodiment the backend servers include a smart router component that programmatically configures the servers to continually scan competing marketplaces and automatically seek to route orders to the best market, taking into account one or more factors, such as quote size, quote price, liquidity-taker costs, liquidity-provider rebates and the availability of automatic order execution. In certain embodiments, the trader terminal presents the trader with the ability to select from multiple routing options.

Figure 6A:
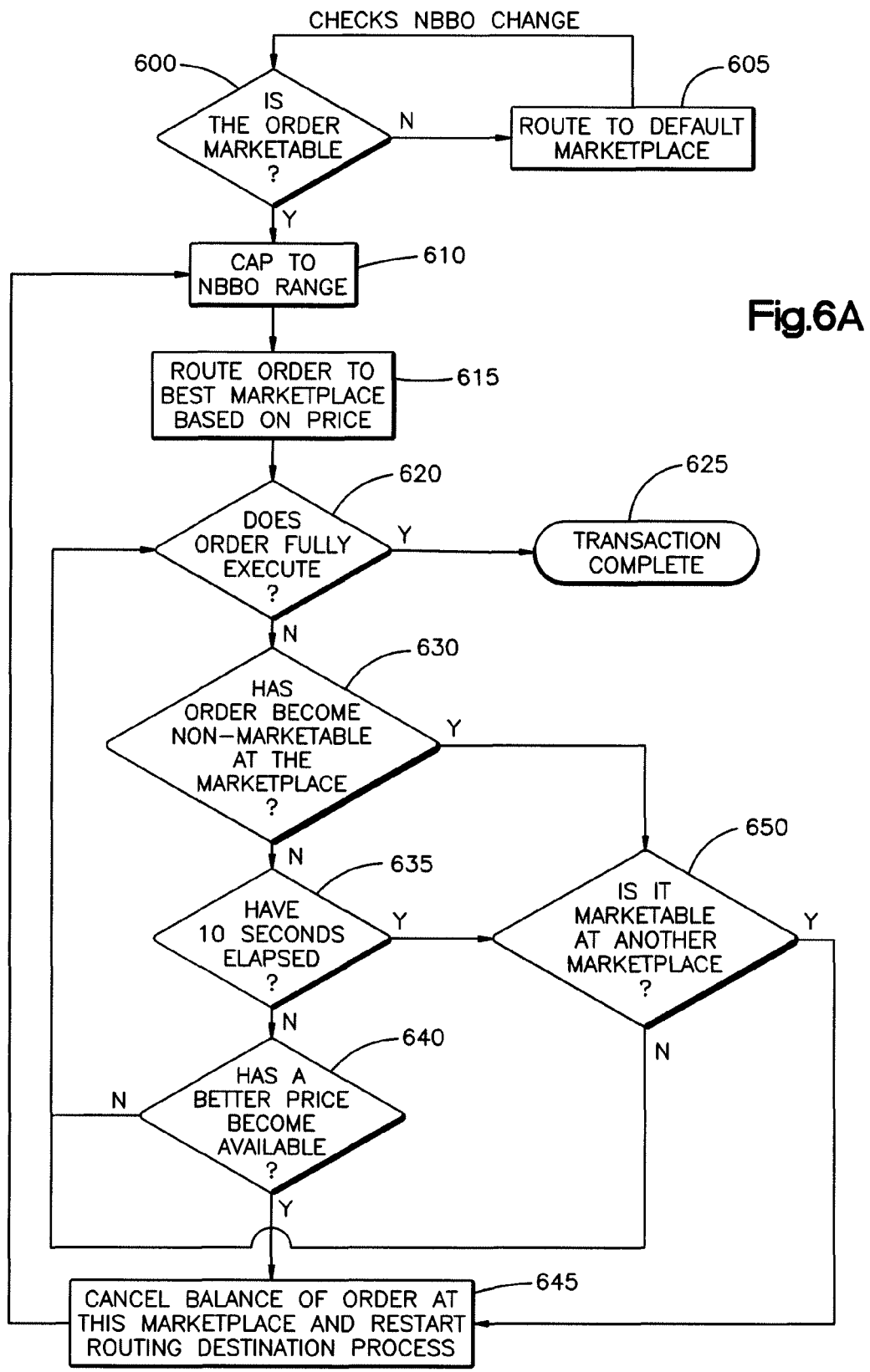
FIGS. 6a-c are flow diagrams of order routing processes according to various embodiments of the present invention.

One illustrative smart routing process flow will now be described with regard to FIG. 6a. As illustrated, the servers 105 determine whether the order to be routed is marketable at marketplaces 150 based on information from the marketplaces 150 (step 600). If the order is not marketable, the servers 105 route the order to a default marketplace 150 (step 605) with the hopes that the order does become marketable, and the servers 105 continue to check the NBBO to determine if the order is marketable.

If the order is marketable, the order is capped to the NBBO range (step 610). The servers 105 then route the order to the marketplace 150 with the best price (step 615). Once the order is routed to a marketplace 150, the servers 105 wait for execution information from the marketplace 150 and, once execution information is received, update the database 125 and determine whether the order was fully executed (step 620). If it is fully executed, then the order is complete (step 625). If the order is not fully executed (i.e., partial fill), then the servers 105 check whether the order has become unmarketable at the particular marketplace 150 to which the order was routed (step 630).

If the order is still marketable at the marketplace 150, then the servers 105 wait a period of time, for example ten seconds, for the order to fully execute (step 635). The servers 105 track the elapsed time by, for example, storing in database 125 the time the order was partially filled (in step 620). Until the time period elapses, the servers 105 determine whether a better price has become available at another marketplace 150 (step 640). If not, then the servers 105 wait for execution of the balance of the order (step 620). If a better price has become available at a different marketplace 150, then the servers 105 cancel the open portion of the order (step 645) and the routing process restarts with the order being capped to the NBBO range (step 610).

If the time period (in step 635) has elapsed without the order executing or if the order became unmarketable at the marketplace 150 (in step 630), then the servers 105 determine whether the order is marketable at another marketplace 150 (step 650). If the order is not marketable at another marketplace 150, then the order remains open at the same marketplace 150 and the servers 105 wait for the balance to execute (step 620). If the order is marketable at another marketplace 150, then the servers 105 cancel the open portion of the order (step 645) and the process continues with the order being capped to NBBO range (step 610).

Figure 6B:
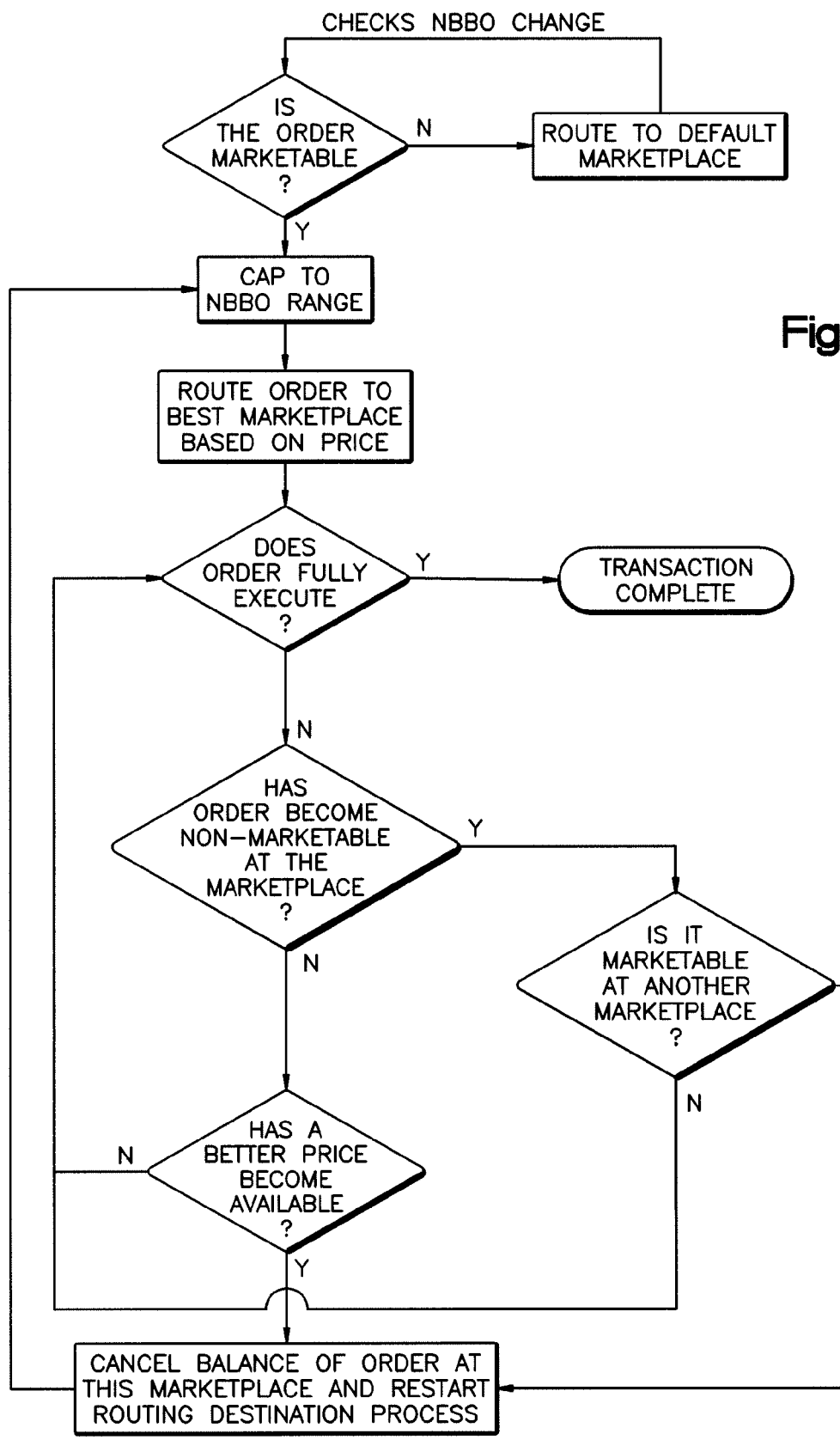
Figure 6C:
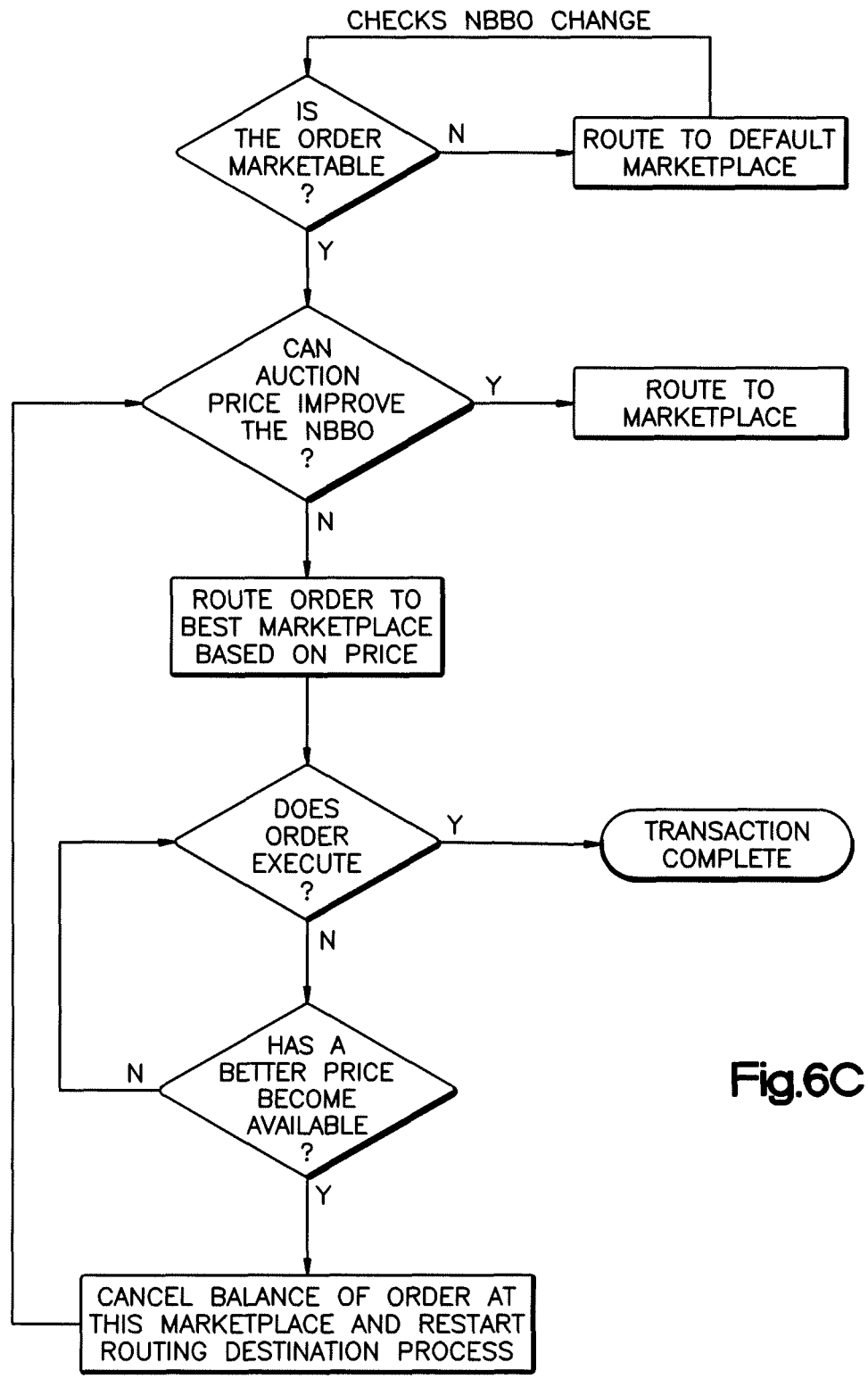

It should be understood that the same or different smart routing process can be used for different types of securities. For example, the foregoing process may be used for United States stocks and bonds and Canadian stocks, and another process (see FIG. 6b), for example, one similar to the foregoing but without the steps pertaining to waiting a predetermined time period, may be used for other stocks. Similarly, another smart-routing process (see FIG. 6c) (for example, for options) may include, after the initial determination is made that the order is marketable, a determination as to whether an auction price at a marketplace can improve the price and if so, the order is routed to the appropriate marketplace; otherwise, the order is routed to the marketplace with the best price.

While there have been shown and described fundamental novel features of the invention as applied to the illustrative embodiments thereof, it will be understood that omissions and substitutions and changes in the form and details of the disclosed embodiments of the invention may be made by those skilled in the art without departing from the spirit of the invention. In this regard, it should be understood that the embodiments are merely illustrative, and that the various features and implementations may be combined, interchanged and/or modified.

I claim:

1. A computer-implemented method for reducing potential communication interruptions with a trader terminal in connection with submitting a plurality of component orders for a security to one or more electronic marketplaces, the method comprising:

one or more computer processors generating electronic scale component orders for the security, including an initial scale component order and subsequent scale component orders, based on scale order parameters received from the trader terminal, including: maximum position in the security; size of scale component orders; starting price; price increment and a profit offset; wherein the initial scale component order has a price based on the starting price and each of the subsequent scale component orders has a price based upon the starting price and the price increment such that the subsequent scale component orders have respective prices that sequentially increment or decrement based upon the price increment;

receiving by the one or more computer processors indications of execution of scale component orders and storing execution details in electronic memory;

in response to execution of the initial scale component order, the one or more computer processors automatically causing submission for trading on the one or more electronic marketplaces one of the subsequent scale component orders, without a need for any intervention of the trader terminal between execution of the initial scale component order and submitting the subsequent scale component order;

storing in electronic memory an aggregate filled quantity of the scale component orders;

in response to execution of one of the scale component orders, the one or more computer processors automatically causing submission for trading on the one or more electronic marketplaces a profit-taking order for the security, without a need for any intervention of the trader terminal between execution of the one scale component order and submitting the profit-taking order, the profit-taking order being in an opposite direction as the scale component orders and at a price for the security that is better than that of the executed one scale component order, the price for the profit-taking order being based on a price at which the executed one scale component order executed and the profit offset;

the one or more computer processors automatically causing submission for trading further ones of the subsequent scale component orders in response to executed scale component orders and further profit-taking orders until at least one termination condition is satisfied, the termination conditions including the aggregate filled quantity being equal to or greater than the maximum position.

2. The method of claim 1 wherein the profit-taking order is for a quantity equal to the filled quantity of the executed scale component order.

3. The method of claim 1 further including canceling a scale component order upon receiving an indication of execution of a profit-taking order.

4. The method of claim 1 further comprising:

receiving an indication of execution of each profit-taking order, each profit-taking order having a filled quantity; and restoring to the scale component orders quantities filled in executed profit-taking orders.

5. The method of claim 4 wherein the restoring further includes automatically submitting for trading additional scale component orders until the aggregate filled quantity equals the maximum position plus the filled quantity of each profit-taking order.

6. The method of claim 1 wherein:

the scale component order is at the starting price and each subsequent scale component order is at a price that differs from the price of an immediately prior scale component order by the price increment.

7. The method of claim 1 wherein the automatically generating of scale component orders and profit-taking orders is performed using the one or more computer processors, the method further comprising:

receiving, as part of a single order ticket from the trader terminal, which is remote from the processors, scale order parameters input by a market participant.

8. The method of claim 1, wherein the scale component orders comprise a scale order further including:

receiving an instruction to restart the scale order and an indication of an existing position quantity for filled scale component orders; and wherein automatically submitting for trading further scale component orders includes basing the further scale component orders on an assumption that the existing position quantity was filled as scale component orders based on the scale order parameters.

9. The method of claim 8 wherein the scale component orders include an initial scale component having an initial scale component size and the method further includes:
receiving an indication of an existing filled portion of the initial scale component less than the initial scale component size and automatically generating an initial scale component for a quantity equal to the initial scale component size less the existing filled portion.

10. The method of claim 1 wherein the size of the scale component orders is determined by dividing the maximum position by the number of scale component orders.

11. The method of claim 1 wherein the security is selected from a group of securities comprising stocks, bonds, fund shares, including mutual funds and exchange traded funds, future contracts, options and foreign exchange.

12. The method of claim 1 wherein the termination conditions further include the orders being cancelled.

13. The method of claim 1 wherein the scale order parameters are received in a single scale order transmission from the trader terminal.

14. The method of claim 13 wherein the single scale order transmission further includes selection of a profit-taking option.

15. A computer-implemented method for reducing potential communication interruptions with a trader terminal in connection with submitting a plurality of component orders for a security to one or more electronic marketplaces, the method comprising:
receiving, at the trader terminal, details of a scale order for the security;
transmitting the details to a processor configured to automatically generate multiple scale component orders for the security without further intervention by the trader terminal between scale components being generated, the multiple scale component orders based on a maximum position of the security for the scale order, a starting price for the scale components, a price increment, a scale component size and a profit offset; wherein the scale component orders include an initial scale component order having a price based on the starting price, and a plurality of subsequent scale component orders each having a price based upon the starting price and the price increment such that the subsequent scale component orders have respective prices that sequentially increment or decrement based upon the price increment;
presenting to the trader terminal a profit-taking option, which, when selected and communicated to the processor, causes the processor to automatically generate one or more profit-taking orders for the security in response to execution of one or more of the scale component orders without further intervention by the trader terminal between profit-taking orders being generated, the profit-taking orders being in an opposite direction as the scale component orders and having a price based on the profit offset and a price at which the executed one or more scale component orders executed; and
receiving indications of execution of the scale component orders and, if the profit-taking option is selected, execution of the profit-taking orders.

16. The method of claim 15 further comprising presenting to the trader terminal a restore option, which, when the profit-taking option and the restore options are selected and communicated to the processor, causes the processor to, following execution of a profit-taking order in a quantity, restore to the scale order the profit-taking order quantity.

17. The method of claim 16 wherein the processor is configured to:
track an aggregate position in the security from filled scale component orders and to continue to submit for trading scale component orders until the aggregate position equals the maximum position; and
restore to the scale order the profit-taking order quantity by reducing the aggregate position by the quantity.

18. The method of claim 15 further comprising presenting to the trader terminal a restart option and an option to enter an existing position quantity for filled scale components, which, when selected and communicated to the processor, causes the processor to process the scale order as though the specified quantity of the order was already scaled into components and filled as scale components.

19. The method of claim 18 wherein the initial scale component has an initial scale component size and wherein the restart option further includes an option for the trader to enter a quantity of a filled portion of an initial scale component size if the existing position quantity is smaller than the initial scale component size.

20. A non-transitory computer readable medium containing computer code for reducing potential communication interruptions with a trader terminal in connection with submitting a plurality of component orders for a security to one or more electronic marketplaces, the computer code comprising instructions configured to cause a computer to:
receive details of a scale order for the security, including a maximum position of the security for the scale order, starting price for the scale components, price increment, scale component size and a profit offset;
provide the details to a processor configured to automatically generate multiple scale component orders without further intervention by the trader terminal between scale components being generated, the multiple scale component orders based on the details; wherein the scale component orders include an initial scale component order having a price based on the starting price, and a plurality of subsequent scale component orders each having a price based upon the starting price and the price increment such that the subsequent scale component orders have respective prices that sequentially increment or decrement based upon the price increment;
presenting to the trader terminal a profit-taking option, which, when selected and communicated to the processor, causes the processor to automatically generate one or more profit-taking orders for the security in response to execution of one or more of the scale component orders without further intervention by the trader terminal between profit-taking orders being generated, the profit-taking orders being in an opposite direction as the scale component orders and based on the profit offset and a price at which the executed one or more scale component orders executed; and
receiving indications of execution of the scale component orders and, if the profit-taking option is selected, execution of the profit-taking orders.

21. The non-transitory computer readable medium of claim 20, further comprising computer code configured to cause the computer to generate a graphical user interface having an order entry screen, the order entry screen including inputs for receiving from a trader the details of the scale order.

22. The non-transitory computer readable medium of claim 21, wherein the order entry screen includes inputs for selecting a restore option, which, when the profit-taking option and the restore options are selected and communicated to the processor, causes the processor to, following execution of a profit-taking order in a quantity, restore to the scale order the profit-taking order quantity.

23. The non-transitory computer readable medium of claim 20, wherein the order entry screen includes inputs for selecting a restart option and an option to enter an existing position quantity for filled scale components, which, when selected and communicated to the processor, causes the processor to process the scale order as though the specified quantity of the order was already scaled into components and filled as scale components.

24. The non-transitory computer readable medium of claim 20, further comprising computer code configured to cause the computer to generate a graphical user interface having screens presenting progress of the scale order, including open scale components, pending scale components and filled scale components and, when the profit-taking option is selected, open profit-taking orders, pending profit-taking orders and filled profit-taking orders.

25. The non-transitory computer readable medium of claim 20 wherein the computer code is configured to cause the computer to provide the details to the processor in a single transmission.

26. The non-transitory computer readable medium of claim 25 wherein the single transmission includes details of the scale components and of the profit-taking orders.

27. The method of claim 15 wherein the details of the scale order are transmitted to the processor in a single scale order transmission.

28. The method of claim 27 wherein the single scale order transmission further includes selection of a profit-taking option.

29. The non-transitory computer readable medium of claim 20 wherein the scale order parameters are received in a single scale order transmission from the trader terminal.

30. The non-transitory computer readable medium of claim 29 wherein the single scale order transmission further includes selection of a profit-taking option.

\* \* \* \* \*